United States Patent [19]

Breward et al.

[11] 4,399,899
[45] Aug. 23, 1983

[54] CLUTCH RELEASE BEARINGS

[75] Inventors: Michael J. Breward, Hitchin; Andrew M. F. Ritchie, Newport Pagnell, both of England

[73] Assignee: SKF Industrial Trading and Development Co. B.V., Nieuwegein, Netherlands

[21] Appl. No.: 209,055

[22] Filed: Nov. 21, 1980

Related U.S. Application Data

[60] Division of Ser. No. 716,949, Aug. 23, 1976, Pat. No. 4,252,225, which is a continuation of Ser. No. 460,240, Apr. 11, 1974, abandoned.

[30] Foreign Application Priority Data

Apr. 13, 1973 [GB] United Kingdom ............... 18037/73

[51] Int. Cl.³ .............................................. F16D 19/00
[52] U.S. Cl. .................................. 192/98; 192/89 B; 308/233
[58] Field of Search ...................... 192/98, 99 S, 99 R, 192/70.27, 89 B; 308/233

[56] References Cited

U.S. PATENT DOCUMENTS 3,583,537  6/1971  Spannagel .................... 192/70.27 X
3,973,659  8/1976  Ernst et al. ........................ 192/89 B
4,159,052  6/1979  Ernst et al. ............................ 192/98

FOREIGN PATENT DOCUMENTS 1475273  4/1969  Fed. Rep. of Germany .... 192/89 B

Primary Examiner—George H. Krizmanich
Attorney, Agent, or Firm—Daniel M. Rosen

[57] ABSTRACT

A clutch release bearing for attachment to a diaphragm spring declutching member, the bearing comprising an outer race and an inner race, an annular series of rolling elements which roll on the raceway of each race to transmit thrust therebetween, one bearing race having a radially extending shoulder for engagement with a diaphragm spring declutching member and a sleeve attached to that race for rotation therewith about the axis of the clutch, which sleeve extends axially for connection with the side of the diaphragm spring declutching member remote from the bearing, the other bearing race having a radially extending shoulder on which a clutch operating member can act to move the bearing axially to engage and disengage the clutch.

1 Claim, 6 Drawing Figures

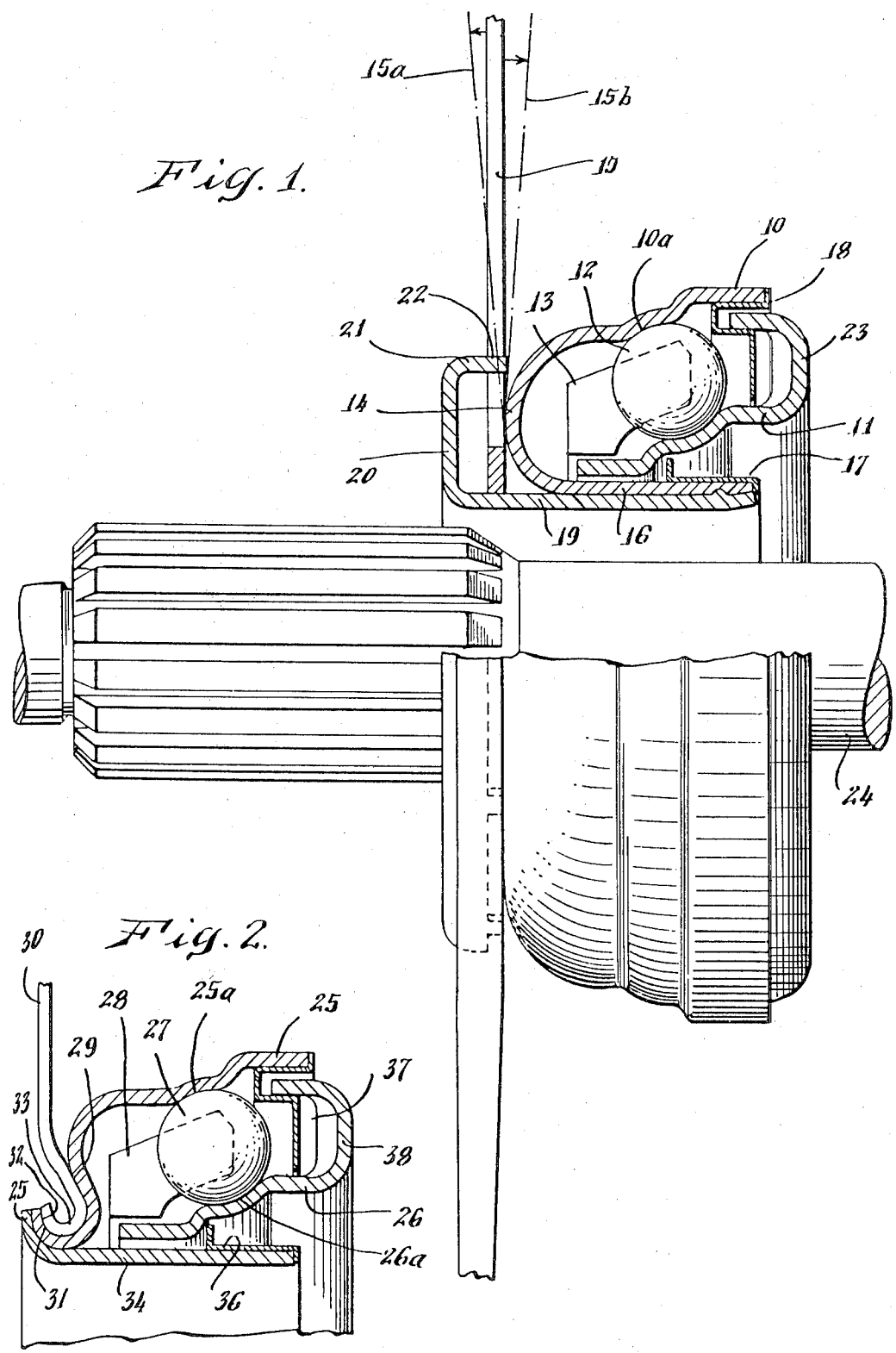

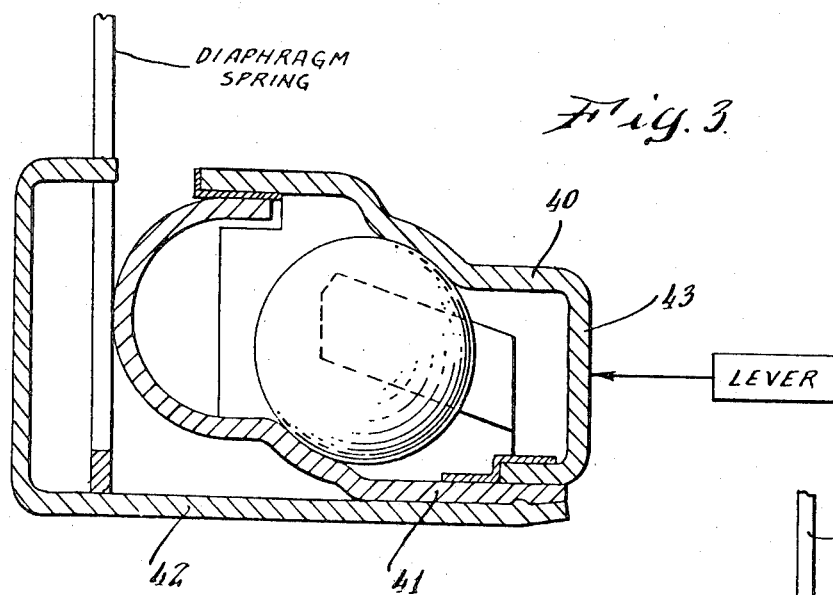
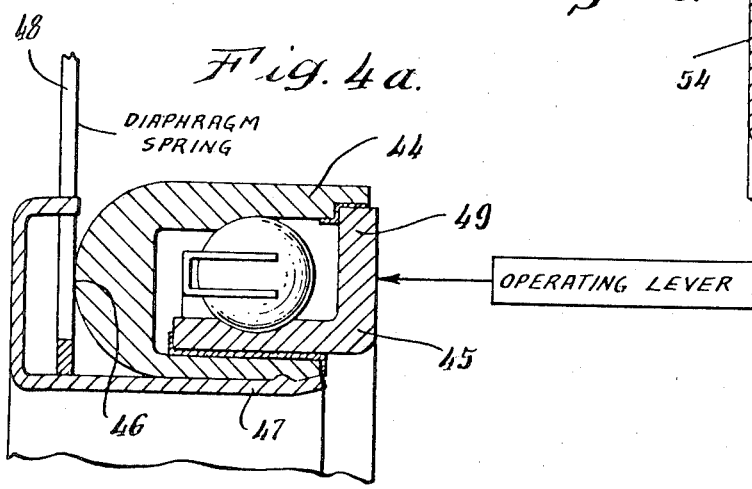
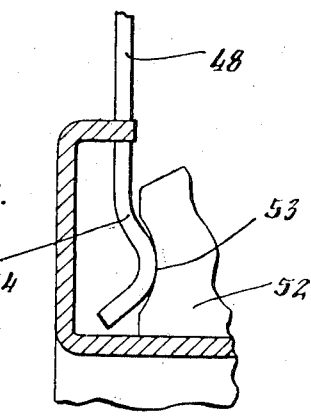
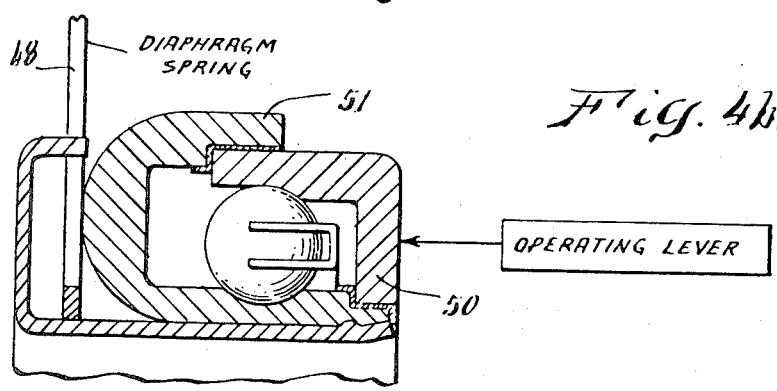

CLUTCH RELEASE BEARINGS

This is a division of application Ser. No. 716,949, filed Aug. 23, 1976, now U.S. Pat. No. 4,252,225, which is a continuation of Ser. No. 460,240, Apr. 11, 1974, abandoned.

In British Pat. No. 1,240,463 there is claimed a friction clutch such as is used between the engine and gear box of a motor car or a lorry and an operating mechanism which has declutching members each having a radial component of extension and which during declutching operation converge. The friction clutch and operating mechanism comprise a thrust bearing which surrounds the axis of rotation of the friction clutch and is free for radial movement relative to such axis. The radial movement of the thrust bearing is limited to ensure that a first race of the thrust bearing will contact all the declutching members adjacent their inner ends. The arrangement is such that on declutching operation the first race of the thrust bearing, if it is not already in contact with the declutching members, is brought into contact with the declutching members and then the thrust bearing by radial movement with respect to the said axis of rotation is permitted to adopt a position determined in part by the declutching members.

In British Pat. No. 1,240,464 there is claimed a clutch release bearing which is a rolled bearing having an inner race and an outer race and wherein one race extends axially beyond the other and has a flange on its axial extension and wherein the other race extends axially beyond the one and has a shoulder on the external surface of its axial extension which shoulder is rounded in radial cross-section and is spaced from and faces towards the end of the last mentioned axial extension also has an outwardly extending flange between the shoulder and the end of the last mentioned axial extension which flange is spaced from the shoulder so that a groove is provided between the flange and the shoulder.

This invention relates to a clutch release bearing.

The present invention provides a clutch release bearing for attachment to a diaphragm spring declutching member. The bearing comprises an outer race and an inner race and an annular series of rolling elements which roll on the raceway of each race to transmit thrust therebetween. One bearing race has a radially extending shoulder for engagement with a diaphragm spring declutching member and a sleeve attached to that race for rotation therewith about the axis of the clutch, which sleeve extends axially for connection with the side of diaphragm spring declutching member remote from the bearing. The other bearing race has a radially extending shoulder on which a clutch operating member can act to move the bearing axially to engage and disengage the clutch.

According to a feature of the invention a limb may extend axially from the shoulder on the one race radially inwardly of the other race, the sleeve being attached to and extending along the limb beyond the shoulder, which sleeve is provided with a radial flange having means for connection to the diaphragm spring declutching member. If this feature is adopted said means may comprise a plurality of axial projections circumferentially spaced around the flange and extending towards the shoulder on the one race, to fit into slots provided in the diaphragm spring.

According to a further feature of the invention the radial flange on the sleeve may extend radially beyond that part of the shoulder on the one race which is engageable with a diaphragm spring declutching member.

According to a still further feature of the invention the shoulder on the one race may be provided with a turned-over end portion to form a groove into which a suitably shaped inner periphery of a diaphragm spring declutching member can engage, the mouth of the groove facing radially outwardly and the sleeve being provided with an outwardly turned flange which is connected to the turned-over end portion of the shoulder. If this feature is adopted the sleeve may extend axially away from the shoulder on the one race to cover the space between the shoulder and the inner race.

According to another feature of the invention the inner and outer bearing races may be made from solid metal. If this feature is adopted, the one race may be provided with a concave groove on one axial face to co-operate with a suitably shaped inner periphery of a diaphragm spring.

According to a still further feature of the invention the one bearing race may be the outer bearing race.

Another aspect of the invention provides the combination of a clutch release bearing as defined in any of the six immediately preceding paragraphs and a diaphragm spring declutching member.

Yet another aspect of the invention provides a clutch when fitted with the combination as defined in the immediately preceding paragraph.

Several embodiments of a clutch release bearing according to the invention will now be described, by way of example, with reference to the accompanying drawngs, in which:

FIG. 1 shows a clutch release bearing in part axial section in engagement with a diaphragm spring declutching member;

FIG. 2 is an axial section through a modified clutch release bearing;

FIG. 3 is an axial section through a clutch release bearing similar to that shown in FIG. 1 of the drawings;

FIG. 4a is an axial section through a clutch release bearing having solid metal race rings;

FIG. 4b is an axial section through a bearing similar to that shown in FIG. 4a, and FIG. 4c is a partial section of a further modification of a clutch release bearing having solid metal race rings.

Referring first to FIG. 1 of the drawings there is shown a clutch release bearing comprising a sheet metal outer race 10 and a sheet metal inner race 11. An annular series of rolling elements 12 retained in a bearing cage 13 is arranged to roll on the raceway 10a, 11a of each race 10, 11 respectively to transmit thrust therebetween. The outer race 10 is formed to provide an integral shoulder 14 which engages one face of an annular diaphragm spring declutching member 15. A limb 16 of the outer race 10, integral with the shoulder 14, extends axially away from the member 15 and radially inwardly of the inner race 11. A sealing member 17 is attached to the limb 16 so as to seal the radial space between the limb and the inner end of the inner race 11. At the radially outer end of the outer race a further sealing member 18 is attached which extends radially inwardly to seal between the radially outer ends of the outer and inner races 10, 11 respectively.

A sheet metal sleeve 19 which surrounds the drive shaft 24 with clearance is connected by peening or other suitable method to the free end of limb 16 and extends axially beyond the shoulder 14 and through the aperture in the annular diaphragm spring 15. The sleeve 19 is provided with a radially extending flange 20 which is formed with a rim 21 extending towards the shoulder 14 terminating with a plurality of circumferentially spaced projections 22 which engage in slots provided in the diaphragm spring 15. In this embodiment the radial flange 20 extends radially beyond the point of engagement of the shoulder 14 with the diaphragm spring 15. An interference fit is achieved between the rim 21 and the diaphragm spring 15 by controlling the position of sleeve 19 in an axial direction during assembly with the result that the diaphragm spring is slightly deformed. The inner bearing race 11 is also formed with an integral shoulder 23 on which a clutch operating member (not shown) can act to move the bearing axially.

In operation to engage the clutch, the clutch operating member is actuated to allow the bearing to move to the right of the position shown in FIG. 1 so that the diaphragm spring 15 is flexed and adopts the position shown in broken lines 15a. In order to disengage the clutch the operating lever causes the bearing to be moved to the left of the position shown in FIG. 1 so that the diaphragm spring 15 is flexed in the opposite direction and adopts the position shown in broken lines 15b.

The clutch release bearing is free for radial movement relative to the shaft and the radial movement of the bearing is limited to maintain it out of contact with the shaft. The bearing assembly will automatically re-center itself with respect to the drive shaft axis if it is displaced, for example, due to shock loads.

Referring now to FIG. 2 of the drawings there is shown a modified construction of a clutch release bearing in accordance with the invention. The bearing comprises a sheet metal outer race 25 and a sheet metal inner race 26. An annular series of rolling elements 27 retained in a bearing cage 28 is arranged to roll on the raceway 25a, 26a of each race 25, 26 respectively to transmit thrust therebetween.

The outer race 25 is formed to provide an integral shoulder 29 which engages one face of an annular diaphragm spring declutching member 30. The shoulder 29 is extended to provide a turned-over end portion 31 which forms a groove 32 the mouth of which faces radially outwardly. The radially inner periphery of the annular diaphragm spring 30 is turned-over to form a rim 33 which is hook-shaped in cross-section and which is engageable with the groove 32. A sheet metal sleeve 34 which surrounds the drive shaft (not shown) with clearance is provided with an outwardly turned flange 35 which is connected to the turned-over end portion 31 of the shoulder extension and the sleeve extends axially away from the diaphragm spring to cover the space between the outer race 25 and the inner race 26. A seal member 36 is attached to the free end of sleeve 34 and seals the space between the sleeve end and the radially inner end of the inner race 26. A further seal member 37 is attached to the radially outer end of the outer race 25 and extends radially inwardly to seal between the radially outer ends of the outer and inner races 25, 26 respectively.

The inner race 26 is also formed with an integral shoulder 38 on which a clutch operating member (not shown) can act to move the bearing axially. In operation the diaphragm spring will flex in a similar manner to engage and disengage the clutch as described with reference to FIG. 1 of the drawings.

FIG. 3 of the drawings shows a clutch release bearing having a sheet metal outer race 40 and a sheet metal inner race 41. The bearing of FIG. 3 is similar to that shown in FIG. 1 except that the sheet metal sleeve 42 is attached to the inner bearing race 41 and the outer bearing race 40 has a radially extending shoulder 43 on which a clutch operating member can act.

Referring to FIG. 4a of the drawings there is shown a clutch release bearing in which both the outer race 44 and the inner race 45 are made from solid metal. The outer race 44 is provided with a radiused shoulder 46 which engages one face of an annular diaphragm spring declutching member 48.

A sheet metal sleeve 47 extends from a radially inner limb of the outer race 44 and has projections which engage the diaphragm spring 48 as described with reference to FIG. 1 of the drawings. The inner race 45 has a radially extending shoulder 49 on which a clutch operating member can act to move the bearing axially. FIG. 4b shows a clutch release bearing which is similar to that shown in FIG. 4a except that the inner race 51 is provided with the radiused shoulder which engages one face of the diaphragm spring and the outer race 50 has a radially extending shoulder on which a clutch operating member can act.

In FIG. 4c of the drawings part of another clutch release bearing embodying the invention is shown which has a solid metal inner race 52 which is provided with a concave groove 53 in one end face to co-operate with a hook-shaped rim on a diaphragm spring 54 similar to that described with reference to FIG. 2 of the drawings.

In British Pat. No. 1,240,463 there is claimed a friction clutch such as is used between the engine and gear box of a motor car or a lorry and an operating mechanism which has declutching members each having a radial component of extension and which during declutching operation converge. The friction clutch and operating mechanism comprise a thrust bearing which surrounds the axis of rotation of the friction clutch and is free for radial movement relative to such axis, the radial movement of the thrust bearing being limited to ensure that a first race of the thrust bearing will contact all the declutching members adjacent their inner ends and the arrangement being such that on declutching operation the first race of the thrust bearing, if it is not already in contact with the declutching members, is brought into contact with the declutching members and then the thrust bearing by radial movement with respect to the said axis of rotation is permitted to adopt a position determined in part by the declutching members.

In British Pat. No. 1,240,464 there is claimed a clutch release bearing which is a rolling bearing having an inner race and an outer race and wherein one race extends axially beyond the other and has a flange on its axial extension and wherein the other race extends axially beyond the one and has a shoulder on the external surface of its axial extension which shoulder is rounded in radial cross-section and is spaced from and faces towards the end of the last mentioned axial extension, and wherein the last mentioned axial extension also has an outwardly extending flange between the shoulder and the end of the last mentioned axial extension which flange is spaced from the shoulder so that a groove is provided between the flange and the shoulder.

What is claimed is:

1. A clutch release bearing for attachment to a diaphragm spring declutching member, the bearing comprising an outer race and an inner race, an annular series of rolling elements which roll on the raceway of each race to transmit thrust therebetween, a first of said races having a radially extending shoulder for engagement with said diaphragm spring declutching member and a sleeve attached to said first race for rotation therewith about the axis of the clutch, which sleeve extends axially or connection with the side of said diaphragm spring declutching member remote from the bearing, the other of said races having a radially extending shoulder for directly engaging a clutch operating member which is operable to move the bearing axially to engage and disengage the clutch, said shoulder on said first race being provided with a turned-over end portion to form a groove into which a suitably shaped inner periphery of said diaphragm spring declutching member is engagable, said groove having a mouth facing radially outward, and said sleeve being provided with an outwardly turned flange connected to said turned-over end portion of said shoulder.

* * * * *

UNITED STATES PATENT AND TRADEMARK OFFICE
CERTIFICATE OF CORRECTION

PATENT NO.   : 4,399,899
DATED        : 8-23-83
INVENTOR(S)  : Breward, Michael J. and Ritchie, Andrew M.

It is certified that error appears in the above—identified patent and that said Letters Patent is hereby corrected as shown below:

Col. 4, delete in entirety lines 33 thru 65.

Col. 5, line 8, delete "or" and insert --for--.

Signed and Sealed this

Twenty-fourth Day of July 1984

[SEAL]

Attest:

GERALD J. MOSSINGHOFF

Attesting Officer    Commissioner of Patents and Trademarks